(12) United States Patent
Schlachter et al.

(10) Patent No.: US 10,271,027 B2
(45) Date of Patent: *Apr. 23, 2019

(54) METHOD AND DEVICE FOR PROJECTING AN IMAGE WITH IMPROVED SAFETY

(71) Applicant: North Inc., Kitchener (CA)

(72) Inventors: Jeremy Schlachter, Biederthal (FR); Nicolas Abele, Lausanne (CH)

(73) Assignee: North Inc., Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,836

(22) Filed: Oct. 9, 2017

(65) Prior Publication Data

US 2018/0131916 A1 May 10, 2018

Related U.S. Application Data

(63) Continuation of application No. 14/901,004, filed as application No. PCT/EP2013/063419 on Jun. 26, 2013, now Pat. No. 9,787,959.

(51) Int. Cl.
*H04N 9/31* (2006.01)
*G03B 21/20* (2006.01)
*G02B 26/08* (2006.01)

(52) U.S. Cl.
CPC ........ *H04N 9/3185* (2013.01); *G02B 26/0833* (2013.01); *G03B 21/2033* (2013.01); *G03B 21/2053* (2013.01); *G03B 21/2086* (2013.01); *H04N 9/3129* (2013.01); *H04N 9/3155* (2013.01)

(58) Field of Classification Search
CPC ............ G03B 21/2033; G03B 21/2053; G03B 21/2086; H04N 9/3129; H04N 9/3155; H04N 9/3161
See application file for complete search history.

(56) References Cited

U.S. PATENT DOCUMENTS

| | | | |
|---|---|---|---|
| 2007/0001111 A1 | 1/2007 | Rueb et al. | |
| 2011/0211243 A1 | 9/2011 | Smits | |
| 2012/0218525 A1 | 8/2012 | Kwon et al. | |
| 2014/0063475 A1* | 3/2014 | Tsai | G03B 21/2033 353/121 |
| 2014/0160445 A1* | 6/2014 | Oi | G03B 21/2033 353/85 |

FOREIGN PATENT DOCUMENTS

| | | | |
|---|---|---|---|
| JP | 2005107456 A | 4/2005 | |
| JP | 2006072319 A | 3/2006 | |
| JP | 2009086366 A | 4/2009 | |

(Continued)

*Primary Examiner* — Sultan Chowdhury
(74) *Attorney, Agent, or Firm* — Cozen O'Connor

(57) ABSTRACT

Disclosed is a projection device including a MEMS mirror which oscillates about one or more oscillation axes to scan light from one or more lasers, across a display screen, to project pixels which define an image onto a display screen. Also disclosed is a display method including selecting a laser class for the projection device; calculating a relationship between maximum accessible emission limit and distance, for the selected laser class; and selecting a desired maximum accessible emission limit for an image which is to be projected by the projection device onto said display screen.

25 Claims, 8 Drawing Sheets

(56) References Cited

FOREIGN PATENT DOCUMENTS

| | | | |
|---|---|---|---|
| JP | 2009237061 | A | 10/2009 |
| JP | 2010117683 | A | 5/2010 |
| JP | 2011507336 | A | 3/2011 |
| JP | 2011137878 | A | 7/2011 |
| JP | 2012083871 | A | 4/2012 |
| JP | 2012124880 | A | 6/2012 |
| JP | 2013501247 | A | 1/2013 |
| JP | 5157742 | B2 | 3/2013 |
| JP | 2013140078 | A | 7/2013 |
| JP | 2014524046 | A | 9/2014 |

\* cited by examiner

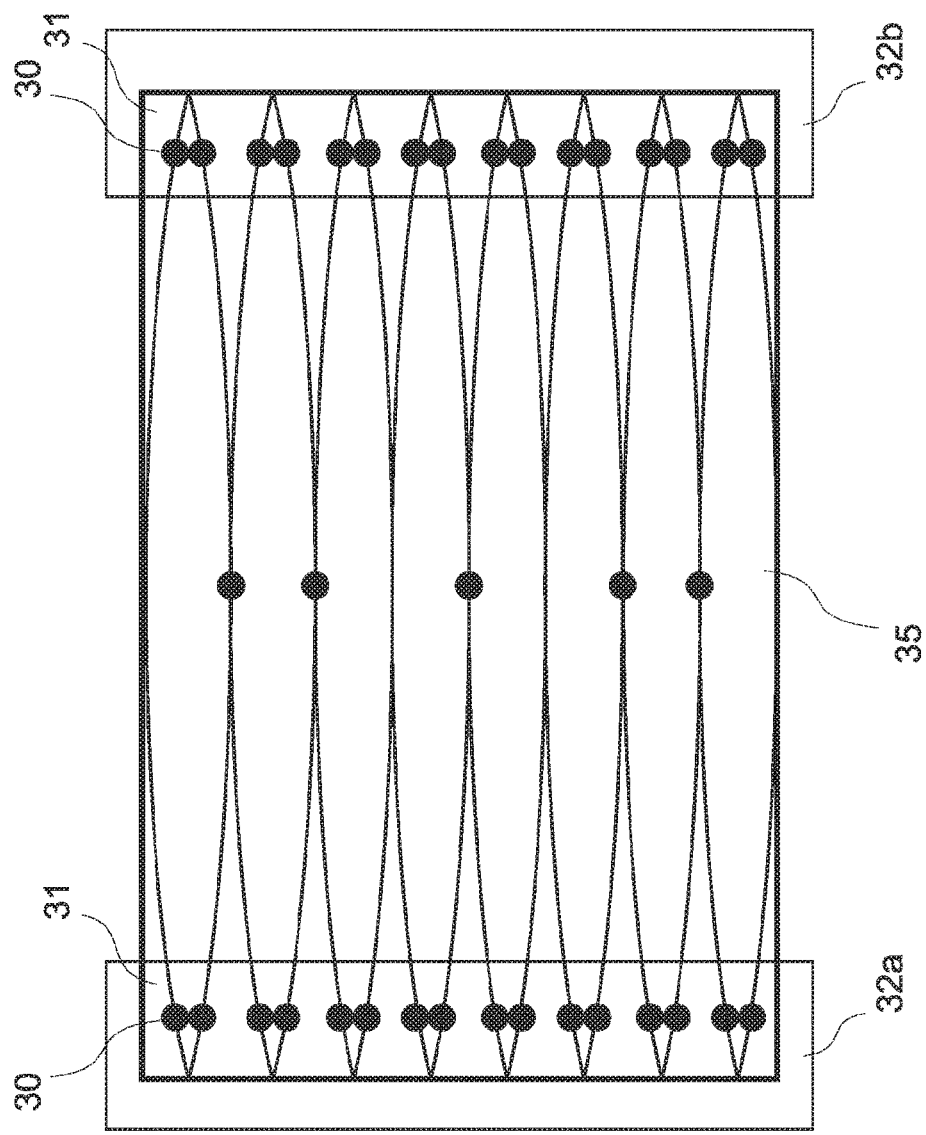

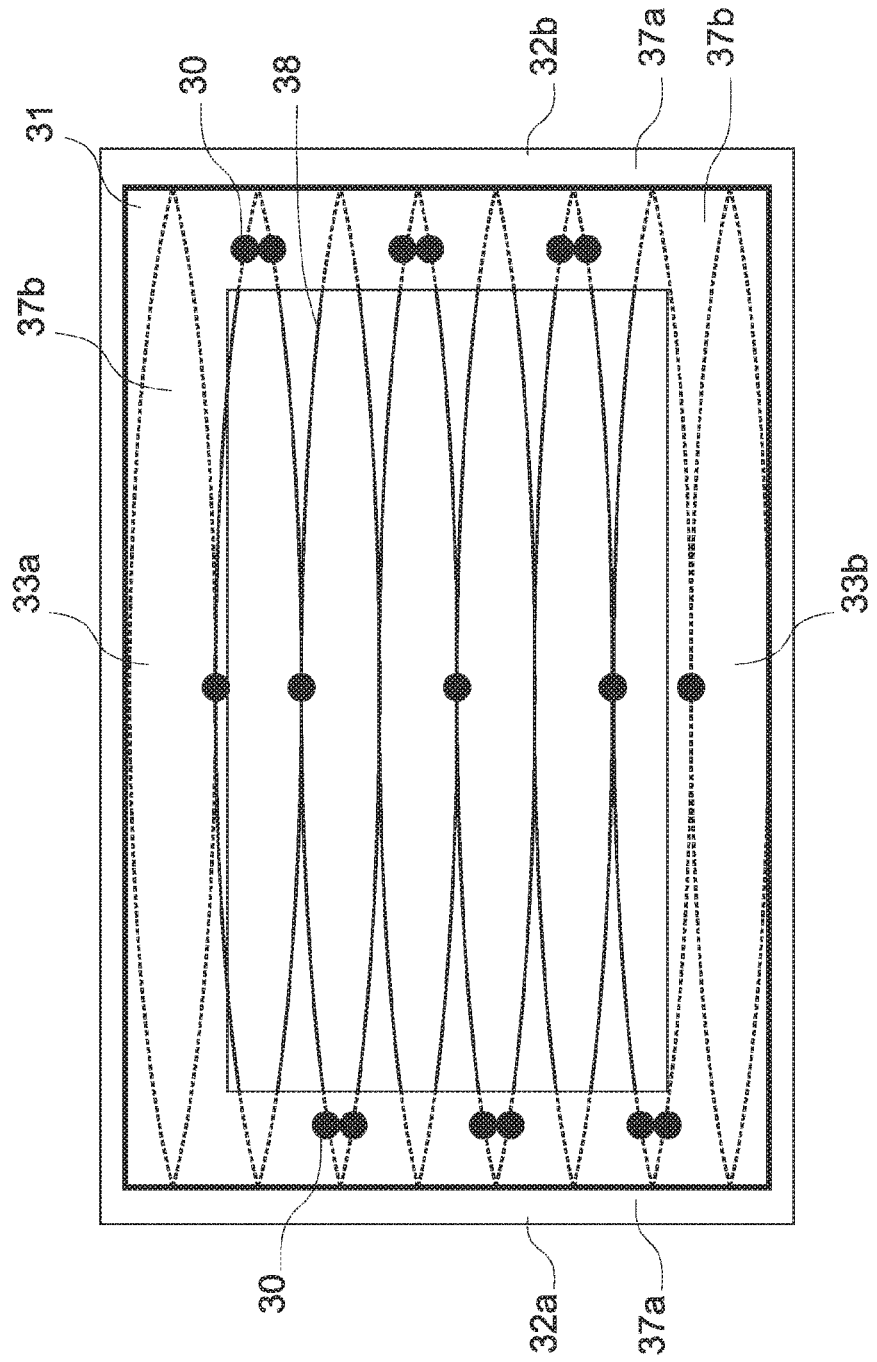

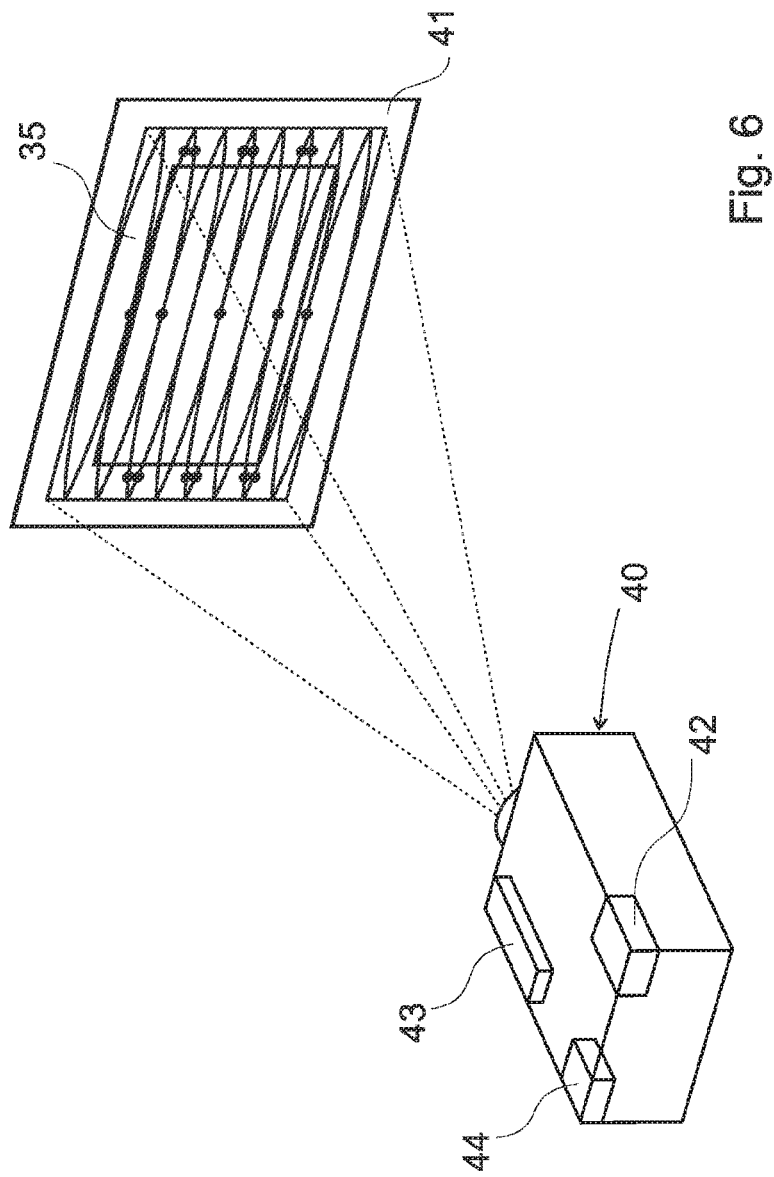

METHOD AND DEVICE FOR PROJECTING AN IMAGE WITH IMPROVED SAFETY

CROSS-REFERENCE TO RELATED APPLICATIONS

This application is a Continuation of U.S. patent application Ser. No. 14/901,004 filed Dec. 22, 2015 which is a national stage application claiming the benefit of and priority to International Application No. PCT/EP2013/063419 filed Jun. 26, 2013 both of which are hereby incorporated by reference in their entirety.

FIELD OF THE INVENTION

The present invention concerns a method and device for projecting an image with improved safety. In particular, but not exclusively the present invention concerns a method which involves modifying the pixel stream so that the pixel stream which defines the image to be projected is provided with a predetermined number of black pixels so that the projection device is maintained within the standard for a selected laser class under the international laser class safety regulation. A corresponding projection device is also provided.

DESCRIPTION OF RELATED ART

Many projection devices comprise a MEMS mirror which is used to reflect light to a display screen and which is oscillated about one or more oscillation axes to scan light across a display screen to project an image on the display screen. These projection devices typically use laser light to project the image. Accordingly, these projection devices are subject to the international laser class safety regulation. The laser class safety regulation defines how safe each laser is according to the maximum light intensity that a laser can emit (referred to hereafter as the "maximum accessible emission Limit") Safety class 1-4 exist in the class safety regulation; class 1 lasers are the safest class of laser as their maximum accessible emission limit is the lowest among all the laser classes; in contrast class 4 are the most dangerous lasers; class 4 lasers can provide an unlimited amount of light emission, in other words there is no maximum accessible emission limit defined for class 4 lasers. Above class 1 is class 2 lasers and above class 2 is class 3 lasers; class 2 lasers have a maximum accessible emission limit which is higher than class 1 and class 3 lasers have a maximum accessible emission limit which is higher than that for class 2. Class 4 lasers are those lasers which can emit a light intensity which is greater than the maximum accessible emission Limit for class 3. Projection devices use lasers which emit light which defines pixels of a projected image; therefore projection device are also governed by the laser class safety regulation. Projection devices which are classified as class 1 provide maximum safety for the user due to their low maximum accessible emission limit; because of their low maximum accessible emission limit the laser light emitted from these projection devices will not damage a user's eye. Accordingly it is most favourable, for safety reasons, for projection devices to be class 1 under the international laser class safety regulation. Note that laser class maximum accessible emission limit values are dependent on the laser-based system; in other words a projection device may comprise a class 3 laser but due to light loss which may occur within the projection device, the maximum light emission from the projection device may not be greater than the maximum accessible emission limit for class 2; in such a case the projection device would be classified as class 2 under the international laser class safety regulation.

Most projection devices are available today are class 2 or greater as the laser light which is emitted from the projection device is focused or collimated. The laser light which is reflected and scanned across the display screen by the MEMS mirror defines pixels of the projected image. Each time the MEMS mirror changes its direction of oscillations it continues to reflect the laser light to the display screen; at this point because the MEMS mirror is oscillating at a slower speed or stopped, the distance between successive pixels on the display screen will be shorter, as illustrated in FIG. 7. In FIG. 7 pixels 50a and 50b are reflected to the display screen when the MEMS mirror changes its direction of oscillation; it is clear that the distance between the pixels 50a and 50b is shorter and is in fact so short that the pixels 50a and 50b overlap or at least are very close to one another (this is in contrast to larger distance between pixels 51a and 51b which are reflected to the display screen when the MEMS mirror is in the middle of it oscillation). Because of the short distance between the pixels 50a and 50b, and because successive light pulses which defined the pixels 50a and 50b have a short time separation, a higher concentration of photons, within 18 us timeframe (18 us is a time below which the international laser class safety regulation consider that two of more pulses should be considered equivalent to a single pulse) and within the area of a human eye, are projected by the projection device to the region of display screen where the pixels 50a and 50b are displayed. This higher concentration of photons will exceed the maximum accessible emission limit set for class 1 in the international laser class safety regulation so that the projection device must be classified as class 2 (or higher) under the international laser class safety regulation.

Furthermore the laser light which is projected by the projection device is usually pulsed; this will further increase the danger posed by the projection device to a user's eyes. In the international laser classification system the accessible emission limits for pulsed laser is lower than that of continuous laser due to the increased risk to a user's eye exposed by pulsed laser light. It is easier for a projection device to exceed the maximum accessible emission limit for a given class if it uses a pulsed laser.

It is an aim of the present invention to obviate or mitigate some of the above-mentioned disadvantages. In particular one of the aims of the present invention to provide a method of projecting an image, which will ensure that the projection device will not exceed the maximum accessible emission limit of a chosen class, when projecting the image.

BRIEF SUMMARY OF THE INVENTION

According to the invention, this aim is achieved by means of a method of projecting an image with improved safety, using a projection device which comprises a MEMS mirror which oscillates about one or more oscillation axes to scan light from one or more lasers, across a display screen, to project pixels which define an image onto a display screen, the method comprising the steps of, (a) selecting a laser class for the projection device;
(b) calculating relationship between maximum accessible emission limit and distance, for the selected laser class, for a predetermined number of black pixels in an image;
(c) repeating step (b) a plurality of times, each for a different predetermined number of black pixels in the image, so as to provide a plurality of relationships between maximum accessible emission limit and distance, for the selected laser class, wherein each relationship is for different predetermined number of black pixels in the image;

(d) determining the distance between a display screen and the projection device;

(e) selecting a desired maximum accessible emission limit for an image which is to be projected by the projection device onto said display screen;

(f) selecting a relationship, from the plurality of relationships between maximum accessible emission limit and distance, which contains a maximum accessible emission limit which is equal to the desired maximum accessible emission limit selected in step (e), at the distance determined in step (d) and;

(g) identifying the predetermined number of black pixels in the image for that selected relationship;

(h) modifying a pixel stream which defines said image which is to be projected by the projection device, so that the pixel stream is provided with said predetermined number of black pixels identified in step (g).

In the most preferably embodiment of the present invention the method comprises the steps of,
(a) selecting a laser class for the projection device;
(b) calculating relationship between maximum accessible emission limit and distance, for the selected laser class, for a predetermined number of black pixels in an image;
(b2) converting the maximum accessible emission limit to a luminosity limit to provide a relationship between luminosity limit and distance, for the selected laser class, for the predetermined number of black pixels in the image;
(c) repeating step (b) and (b2) a plurality of times, each for a different predetermined number of black pixels in the image, so as to provide a plurality of relationships between luminosity limit and distance, for the selected laser class, wherein each relationship is for different predetermined number of black pixels in the image;
(d) determining the distance between a display screen and the projection device;
(e) selecting a desired luminosity for an image which is to be projected by the projection device onto said display screen;
(f) selecting a relationship, from the plurality of relationships between luminosity limit and distance, which contains a luminosity limit, which is equal to the desired luminosity selected in step (e), at the distance determined in step (d) and;
(g) identifying the predetermined number of black pixels in the image for that selected relationship;
(h) modifying a pixel stream which defines said image which is to be projected by the projection device, so that the pixel stream is provided with said predetermined number of black pixels identified in step (g).

In the most preferably embodiment the maximum accessible emission limits are converted to equivalent luminosity limits using equations which are well known in the art, and the luminosity limits are then used when performing the method rather than using the maximum accessible emission limits.

In most cases the luminosity limit is a dictated by light which is emitted due to photo-thermal effect within the projection device. In other cases the luminosity limit might be dictated by light which is emitted due to photo-chemical effect within the projection device.

The pixel stream preferably comprises pixels which define the image to be projected. The image may be a video image or a still image. Preferably, each pixel in the pixel stream will be defined by a light pulse. Most preferably each light pulse will be a modulated light pulse. The pixel stream may be defined by a video stream.

Step (d) may comprise the step of determining the distance between a display screen and the projection device or determining the distance between a human head.

The method may comprise the step of forming a pixel stream by considering each successive or adjacent pixel of a given image and providing such pixel stream to the input of a laser driver. Typical standard pixel streams format are RGB, VGA, HDMI or MIPI.

Preferably, the method will comprise the steps of measuring the distance between the display screen and the projection device, and, dynamically adjusting the number of black pixels which are provided in the pixel stream which defines the image to be projected according to the measured distance, so that the projection device does not exceed a luminosity limit for that class, at the measured distance. The method may comprise the steps of measuring the distance between the human head and the projection device, and, dynamically adjusting the number of black pixels which are provided in the pixel stream which defines the image to be projected according to the measured distance, so that the projection device does not exceed a luminosity limit for that class, at the measured distance.

The step of modifying the pixel stream may comprise the step of modifying the pixel stream so that said determined number of black pixels are provided at opposite sides or around the perimeter of the projected image.

The method may comprise the step of receiving the black pixels which are provided in the pixel stream at the MEMS mirror in the projection device as the MEMS mirror is changing its direction of oscillation about an oscillation axis, so that the black pixels appear on opposite sides of the projected image. Preferably the black pixels are provided in the pixel stream at positions so that they are received by a MEMS mirror in the projection device as the MEMS mirror is changing its direction of oscillation about an oscillation axis, so that the black pixels appear on the sides of the projected image. Preferably the black pixels are provided in the pixel stream at positions so that they are received by a MEMS mirror in the projection device before, during and after the MEMS mirror is changing its direction of oscillation about an oscillation axis.

Preferably the black pixels are provided in the pixel stream at positions such that they are received by a MEMS mirror in the projection device when the MEMS mirror is at a $-50°$ or $+50°$ position, from it starting position, wherein the starting position is considered $0°$. The $0°$ position may also be considered as the rest position for the MEMS mirror. Preferably the $-+50°$ positions are each the maximum amplitude of oscillation position of the MEMS mirror. Thus as the MEMS mirror is precisely at, within $10°$ of, the $-50°$ to $+50°$ positions from its starting position ($0°$), then the MEMS mirror will reflect the black pixels only to the display screen. It should be noted that there are two positions in which the MEMS mirror will be at its maximum amplitude of oscillation; a first maximum amplitude of oscillation will be reached when the MEMS mirror oscillates in a clockwise direction to $+50°$ position from its starting position ($0°$) and a second maximum amplitude of oscillation will be reached when then MEMS mirror oscillates in an anticlockwise direction to $-50°$ position from its starting position ($0°$). Preferably the black pixels are provided in the pixel stream at positions so that they are received by a MEMS mirror in the projection device when the MEMS mirror is at its maximum amplitude of oscillation position.

The MEMS mirror may be configured to oscillate about two oscillation axis and wherein the method comprises the step of receiving the black pixels which are provided in the pixel stream as the MEMS mirror is changing its direction of oscillation about each of the two oscillation axes, so that the black pixels appear around the perimeter of the projected image. Preferably the MEMS mirror is configured to oscillate about two oscillation axis and wherein the black pixels are provided in the pixel stream at a positions so that they are received by a MEMS mirror in the projection device as the MEMS mirror is changing its direction of oscillation about each of the two oscillation axes, so that the black pixels appear around the perimeter of the projected image. Preferably the MEMS mirror is configured to oscillate about two oscillation axis and wherein the black pixels are provided in the pixel stream at a positions so that they are received by a MEMS mirror in the projection device before, during and after, the MEMS mirror is changing its direction of oscillation about each of the two oscillation axes.

The step of modifying the pixel stream so that the pixel stream which defines the image to be projected is provided with said determined number of black pixels may comprise the step of converting pixels in the pixel stream into black pixels.

The number of pixels in the pixel stream which are converted to black pixels is preferably equal to the determined number of black pixels.

Preferably the pixels which are converted to black pixels are pixels which are pixels which are located at on the sides of, or at the perimeter of, the image to be projected.

The step of modifying the pixel stream so that the pixel stream which defines the image to be projected is provided with said determined number of black pixels may comprise the steps of, compressing pixels in the pixel stream, and then, adding black pixels to the compressed pixel stream. Preferably the number of black pixels which are added to the compressed pixel stream is equal to the determined number of black pixels. Preferably the pixel stream is compressed by a number of pixels equal to the determined number of black pixels.

The step of modifying the pixel stream so that the pixel stream which defines the image to be projected is provided with said determined number of black pixels may comprise the steps of, adding black pixels to pixel stream to form a modified pixel stream which comprises image-defining-pixels and added-black-pixels, and then, increasing the scanning angle of the MEMS mirror.

The scanning angle is preferably increased by increasing the amplitude of oscillation of the MEMS mirror about its one or more oscillation axes. The scanning angle of the MEMS mirror is increased by an amount which enables to compensate for the number of black pixel; for example if a pixel is 1 mm diameter at 1 m, and if one black pixel is added at to the two sides of the image, then the full optical scanning angle (i.e. equivalent in angle to two times the full mechanical amplitude of oscillation of the MEMS mirror) is increased to compensate for this pixel; the amount which the optical scanning angle of the MEMS mirror is increased may be calculated as follow $\alpha=2*tg^{-1}(0.5/1000)$, is $\alpha$ the amount which the optical scanning angle is increased and $tg^{-1}$ is the inverse of the tangent trigonometric function; so that the full optical scanning angle of the MEMS mirror is: (the initial scanning angle+$\alpha$).

Another alternative is to increase the scanning angle of the MEMS mirror by the a ratio which is: (the number of black pixels which are provided in the pixel stream+the number of pixels in the pixel stream, other than the black pixels, which are to be projected)/(the total number of pixels in the projected pixels); the full scanning angle of the MEMS mirror will thus be equal to the initial scanning angle of the MEMS mirror multiplied by the ratio: (the number of black pixels which are provided in the pixel stream+the number of pixels in the pixel stream, other than the black pixels, which are to be projected)/(the total number of pixels in the projected pixels). The number of pixels in the pixel stream, other than the black pixels, which are to be projected are referred to as the image-defining-pixels.

The method may further comprise the step of modifying the duration of each of the image-defining-pixels in the modified pixel stream and/or the laser light pulse time and/or duration to compensate for the speed of oscillation of the MEMS mirror. The image-defining-pixels are the pixels in the pixel stream other than the black pixels which were provided in the pixel stream. The laser light pulses are light pulses each which defines one of the image-defining-pixels. The laser light pulse time is the time at which the laser is pulsed; and the duration of the laser light pulse is the length of time over which the laser is pulsed. The goal of modifying the duration of the image-defining pixels is to ensure that all pixels are displayed with the same size on the display screen, whatever the mirror speed is. This is achieved be pulsing the light source, which provides light pulses each which defines a pixel of an image to be projected, faster, when the MEMS mirror is moving at a high speed (i.e. near the middle of it amplitude of oscillation) and pulsing the light source at a slower speed when the MEMS mirror moving at low speed (i.e. near the maximum amplitude of oscillations).

If the mirror oscillation is a sine motion, it is possible to calculate the position of the mirror as a function of time; from that one can calculate the duration of each of the image-defining-pixels in the modified pixel stream using the following equation:

$$\text{Pixel\_duration}(t)=(Res/2)*\sin(2pi*t*Fr-pi/2)$$

Wherein "Res" is the image horizontal resolution (which is predefined), Fr is the resonant frequency of the MEMS mirror (which is predefined) and "t" is the time.

In an embodiment in which there is no increase in scanning angle of the MEMS mirror the duration of the image-defining-pixels is also modified; due to the black pixels which were provided in the pixel stream the image-defining-pixels will be deflected by the MEMS mirror to the display screen when the MEMS mirror is at a different scan angle and therefore at a different scanning speed. Accordingly the duration of the first (and also subsequent) image-defining-pixels must be adapted to compensate for this fact. To determine the duration of each of the image-defining-pixels the following equation is used:

$$\text{Pixel\_duration}(t)=(Res/2+Black\_px)*\sin(2pi*t*Fr-pi/2)$$

Wherein "Black_px" is the half the total number of black pixels which have been provided in the pixel stream.

The method may further comprise the steps of repeating steps (a)-(c) for a plurality of different laser classes, selecting a laser class for the projection device which is to project said image, and selecting the plurality of relationships between luminosity limit and distance, for the laser class selected in the previous step, and using said selected plurality of relationships when performing the steps of (f) and (g) of the method.

The method may comprise the steps of, determining the relationship between the maximum accessible emission limit from a photo-chemical effect within the projection device and the distance from the projection device, for a given laser class, and, when the distance between the projection device and display screen is 10 cm or less, and, if maximum accessible emission limit from the photo-chemical effect within the projection device is greater than maximum accessible emission limit from a photo-thermal effect within the projection device, then modifying the pixel stream which defines the image to be projected so that the pixel stream is provided with a predetermined number of black pixels so that the maximum accessible emission limit from the photo-chemical effect within the projection device is less than, or equal to the maximum accessible emission limit from a photo-thermal effect within the projection device.

The method may further comprise the steps of, determining the relationship between the luminosity limit from a photo-chemical effect within the laser of the projection device and the distance from the projection device, for a given laser class. This is preferably done by calculating relationship between photo-chemical maximum accessible emission limit and distance, for the selected laser class. The photo-chemical maximum accessible emission limit is to protect persons against adverse photochemical effect (for example, photoretinitis—a photochemical retinal injury from exposure to radiation in the wavelength range from 400 nm to 600 nm). The international standard to calculate photo-chemical maximum accessible emission limit and photo-thermal maximum accessible emission limit, as function of distance is known from the standard IEC 60825-1 and the technical report IEC/TR 60825-13.

Then the photo-chemical maximum accessible emission limit is preferably converted to a luminosity limit, in the same manner as shown above (i.e. as was done above for the photo-thermal maximum accessible emission limit), to provide a relationship between luminosity limit and distance, for the selected laser class. The method may further comprise the step of, when the distance between the projection device and display screen is 10 cm or less, and, if luminosity limit from the photo-chemical effect within the projection device is greater than luminosity limit from the photo-thermal effect within the projection device, modifying the pixel stream which defines the image to be projected so that the pixel stream is provided with a predetermined number of black pixels so that the luminosity limit from the photo-chemical effect within the projection device is less than luminosity limit from a photo-thermal effect within the projection device.

For the photochemical effect, the accessible emission limit (AEL) for a given laser wavelength $\lambda$ comprised between 400 nm and 600 nm is given by: AEL=$(3.9 \times [10]^{(-3)})*C3/(\eta*t)$ Watt. Where C3=1 for 400 nm<$\lambda$<450 nm and C3=$[10]^{(0.02(\lambda-450))}$ for 450 nm<$\lambda$<600 nm. For class1 the exposure time is 100 seconds, so t=100. $\eta$ is the fraction of power from the projection device which is delivered to the user's eye, considering the eye as a 7 mm diameter round aperture.

The method may further comprise the steps of, measuring acceleration of the projection device, and, modifying the pixel stream so that the pixel stream which defines the image to be projected is provided with a predefined number of black pixels which ensure that the projection device does not exceed a predefined luminosity limit when the measured acceleration is above a threshold acceleration.

The method may comprise the step of oscillating the MEMS mirror about said one or more oscillation axes to scan light across a display screen in a raster scan, interlaced scan, non-interlaced scan, bi-directional scan, Lissajou scan, a single-sinus scan or a double sinus scan.

According to a further aspect of the present invention there is provided a projection device with improved safety, comprising a software module, wherein the software module comprises software which is configured to carry out the above-mentioned method.

The projection device may further comprise a distance measuring means for determining the distance between a display screen and the projection device or between an object (e.g. a human head) which is present in a projection cone of the projection device and the projection device. Most preferably the projection device will comprise a means for measuring the distance between a display screen and the projection device, and, a means for dynamically adjusting the number of black pixels which are provided in the pixel stream which defines the image to be projected according to the measured distance, so that the projection device does not exceed said maximum accessible emission limit.

The projection device may further comprise an accelerometer, and wherein the software is further configured to receive accelerations measured by the accelerometer and to modify the pixel stream so that the pixel stream which defines the image to be projected is provided with a predefined number of black pixels which ensure that the projection device does not exceed a predefined luminosity limit when the acceleration measured by the accelerometer is above a threshold acceleration.

The projection device may comprise a proximity sensor as distance measurement system which is configured to modify the pixel stream so that the pixel stream which defines the image to be projected is provided with a predefined number of black pixels which ensure that the projection device does not exceed a predefined maximum accessible emission Limit, depending on the distance from the projector to the projection surface, measured by the proximity sensor.

Preferably the "black" pixel(s) which have been provided in the pixel stream will be fully black in colour. In an alternative embodiment the "black" pixel(s) which have been provided in the pixel stream may be non-perfectly black, meaning that the laser light output is not zero, but can be adjusted in order to project light with a light intensity which is lower than initially, sufficiently low to not exceed the predefined maximum accessible emission Limit.

For example considering several black pixels on each side of the image, the first extreme ones may be completely black, then the other having gradually or steadily more intensity up to the point the first "full" power pixel is reached. This will enable to have less number of cut pixels in the image, and therefore lower the reduction of image resolution. Another benefit is that considering the sinus-motion of the mirror, those pixels will be in opposition of the brightness dependency of the image due to MEMS sinus motion (or speed), and therefore using such described technique, the image will have a more uniform brightness.

BRIEF DESCRIPTION OF THE DRAWINGS

The invention will be better understood with the aid of the description of an embodiment given by way of example and illustrated by the figures, in which:

FIGS. 5a and b illustrate how the black pixels appear when the pixel stream is projected;

FIG. 6 shows a projection device according to another aspect of the present invention;

DETAILED DESCRIPTION OF POSSIBLE EMBODIMENTS OF THE INVENTION

The method of the present invention is performed in a projection device which comprises a MEMS mirror which oscillates about one or more oscillation axes to scan light across a display screen to project an image on to the display screen. Preferably the MEMS mirror is oscillated about said one or more oscillation axes to scan light across a display screen in a raster scan, interlaced scan, non-interlaced scan, bi-directional scan, Lissajou scan, a single-sinus scan or a double sinus scan. Preferably the MEMS mirror is oscillated about a single oscillation axis or two orthogonal oscillation axes. The light is provided by one or more lasers, preferably a red, green and blue laser. The one or more lasers provide light in the form of light pulses, wherein each pulse defines a pixel of the image which is to be projected.

Figure 1:
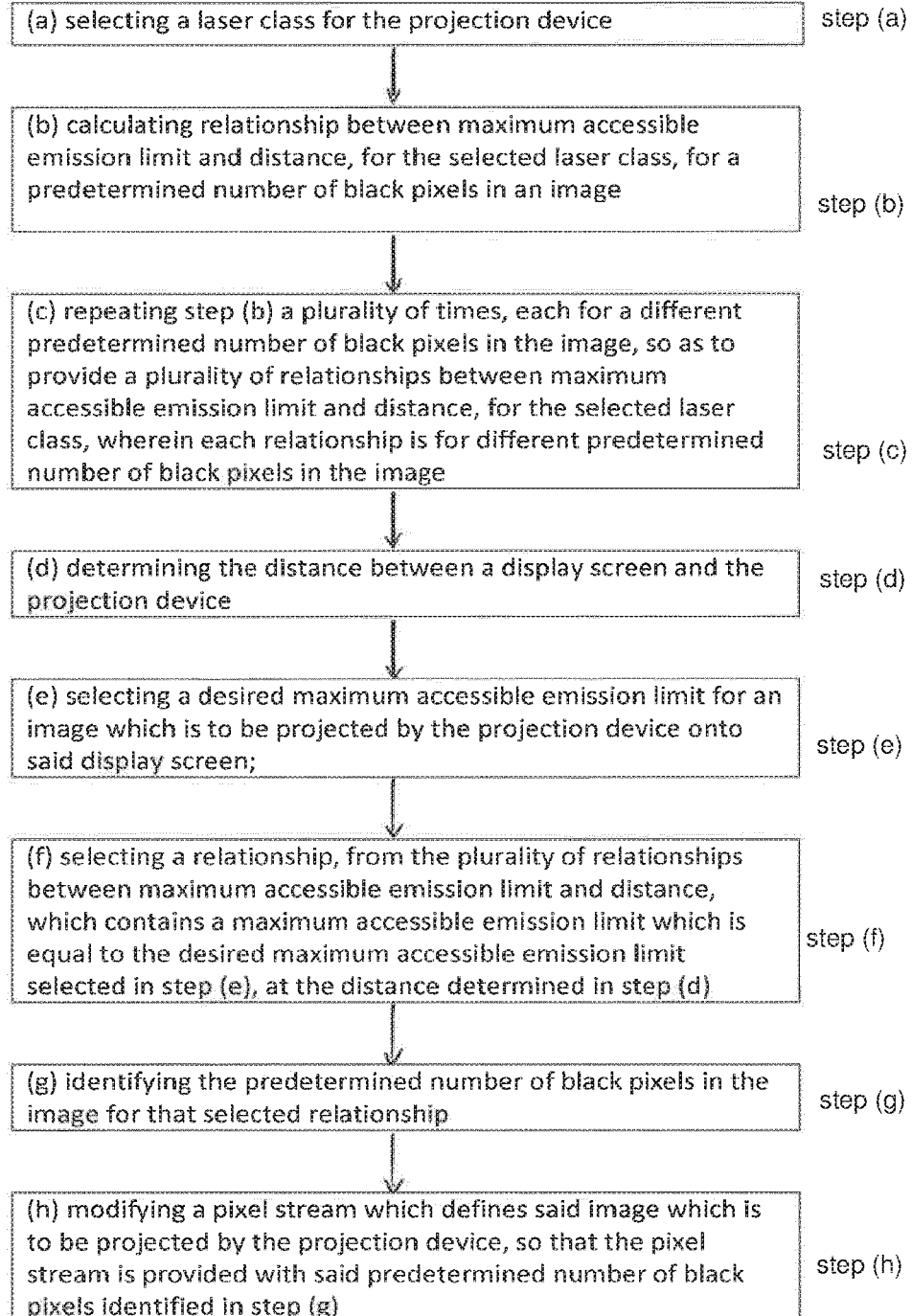
FIG. 1 shows a flow chart of the steps involved when performing the method according to the preferred embodiment of the present invention.

FIG. 1 is a flow chart illustrating the steps involves in a method according to an embodiment of the present invention. The method comprises method comprising the steps of selecting a laser class for the projection device (step (a)); next, the relationship between maximum accessible emission limit and distance, for the selected laser class, for a predetermined number of black pixels in an image, is calculated using equations which are set out in the international laser classification system (step (b)). The maximum accessible emission limit is the maximum accessible emission level permitted within a particular laser class. In this example the maximum accessible emission limit is a photo-thermal maximum accessible emission limit i.e. emission due to photo-thermal effect. The international standard to calculate photo-thermal maximum accessible emission limit, as function of number of "black" portions of the image, and as function of distance is known from the IEC standard 60825-1 and the technical report IEC/TR 60825-13.

Figure 2:
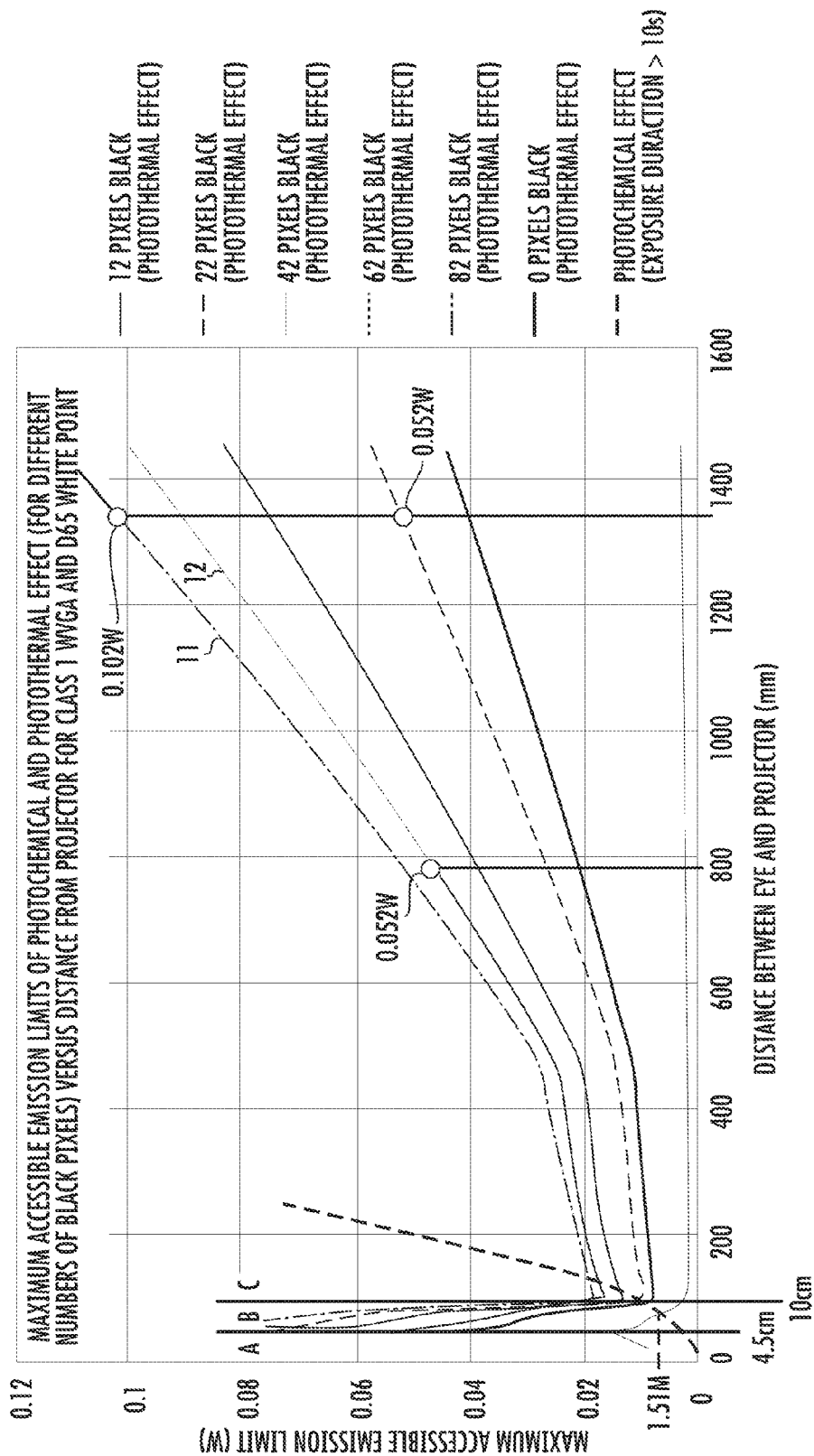
FIG. 2, shows a graph for a given laser class, with curves illustrating the relationship between the maximum accessible emission limit of a projection device versus distance from the projection device, each curve corresponding to when the projection device is projecting an image which is defined by a pixel stream which has been provided with a different predetermined number of black pixels.

Step (b) is repeated a plurality of times, each for a different predetermined number of black pixels in the image, so as to provide a plurality of relationships between maximum accessible emission limit and distance, for the selected laser class, wherein each relationship is for different predetermined number of black pixels in the image (step (c)). The plurality of relationships between maximum accessible emission limit and distance, for the selected laser class, wherein each relationship is for different predetermined number of black pixels in the image, could be represented as curves on a graph, as a table, as one or more mathematical functions, or in any other suitable form. For example, FIG. 2 shows the relationships represented as curves on a graph. The distance from the projection device is shown along the x-axis and the maximum accessible emission limit for the projection device is shown along the y-axis. More maximum accessible emission limit from the photo-thermal effect within the projection device is shown along the y-axis.

Each of the curves shown in the graph of FIG. 2 illustrate the relationship between the maximum accessible emission limit for the projection device versus distance from the projection device for a class 1 projection device. Each curve corresponds to when the projection device is projecting an image, with a certain resolution, which is defined by a pixel stream which has a different predetermined number of black pixels. For example curve 11 corresponds to when the projection device is projecting an image with a certain resolution (e.g. WVGA resolution) which is defined by a pixel stream which has 85 black pixels and curve 12 corresponds to when the projection device is projecting an image which is defined by a pixel stream which has 63 black pixels etc. If the projection device follows the behaviour illustrated in one of the curves shown in the graph of FIG. 2, the projection device will be within the standards set for class 1 of the international laser class safety regulation, thus the projection device will be classified as a class 1 projection device. For example, as illustrated in FIG. 2, in order for projection device to be class 1 under the international laser class safety regulation, then the maximum accessible emission limit of the light which is projected by the projection device, measured at 1350 mm from the projection device, when projection device is projecting an image which contains 85 black pixels, must not exceed 0.102 W. Likewise, as is also illustrated in FIG. 2, in order for the projection device to be class 1 under the international laser class safety regulation, then the maximum accessible emission limit of the light which is projected by the projection device, measured at 750 mm from the projection device, when projection device is projecting an image which contains 63 black pixels, must not exceed 0.052 W.

Referring again to FIG. 1, after the relationships between the maximum accessible emission limit for the projection device versus distance from the projection device, for a given laser class, for when the pixel stream is provided with a different predetermined number of black pixels, has been determined, the distance between a display screen on which the image is to be projected and the projection device is determined (step (d)). In a variation of the embodiment the distance between the projection device a human head which is positioned in a projection cone of the projection device is measured in step (d).

Next the user selects a desired maximum accessible emission limit for an image which is to be projected by the projection device onto said display screen (step (e)).

In next step (step (f)) the user selects a relationship, from the plurality of relationships between maximum accessible emission limit and distance, which contains a maximum accessible emission limit which is equal to the desired maximum accessible emission limit selected in step (e), at the distance determined in step (d). Then the user identifies the predetermined number of black pixels in the image for that selected relationship (step (g)) For example, referring to the graph in FIG. 2, if the projection device is located a distance 1350 mm from the display screen on which the image is to be projected, and if the user selects a desired maximum accessible emission limit of 0.102 W for the projected image, then user can determine from the graph which curve contains the a luminosity limit which is equal to the desired maximum accessible emission limit 0.102 W at a distance 1350 mm. It is identified that the curve which contains the a maximum accessible emission limit 0.102 W at a distance 1350 mm, is the curve which corresponds to when the predetermined number of black pixels in the image is 85 (as illustrated in FIG. 2). Thus, in order for the projection device to remain class 1, 85 black pixels should be provided in the pixel stream which defines the pixels of the image which is to be projected by the projection device. If the user were to provide less than 85 black pixels in the pixel stream then the maximum accessible emission limit of the projection device would exceed that allowed for a class 1 and the projection device would therefore be considered more dangerous and would be classified as a class 2, 3, or 4 projection device according to the international laser class safety regulation.

Likewise if the projection device is located a distance 750 mm from the display screen on which the image is to be projected, and if the user selects a desired maximum accessible emission limit of 0.052 W for the projected image, (as illustrated in FIG. 2), then the user can determine that 63 black pixels should be provided in the pixel stream which defines the pixels of the image, in order for the projection device to remain a class 1 projection device i.e. so that the maximum accessible emission limit of the projection device does not exceed the maximum accessible emission limit for the class 1 of the international laser class safety regulation, at 750 mm from the projection device.

It will be understood that the although the graph in FIG. 2 shows curves which represent the required relationship between the maximum accessible emission limit for the projection device versus distance from the projection device, for class 1 of the international laser class safety regulation, is will be understood that a graph with curves which represent the required relationship for any of the other classes in the international laser class safety regulation could alternatively be used.

Once the number of black pixels to be provided in the pixel stream has been determined then the pixel stream which defines said image which is to be projected by the projection device, is modified, so that the pixel stream is provided with said predetermined number of black pixels identified in step (g) (step h). There are a number of different manners in which the pixel stream can be modified so that it is provided with said predetermined number of black pixels; these different manners will be discussed in more detail later. However, most preferably the step of modifying the pixel stream comprises the step of modifying the pixel stream so that when the pixel stream is projected, said black pixels which are provided in the pixel stream, are projected to opposite sides of, or around the perimeter of, the projected image.

Figure 3:
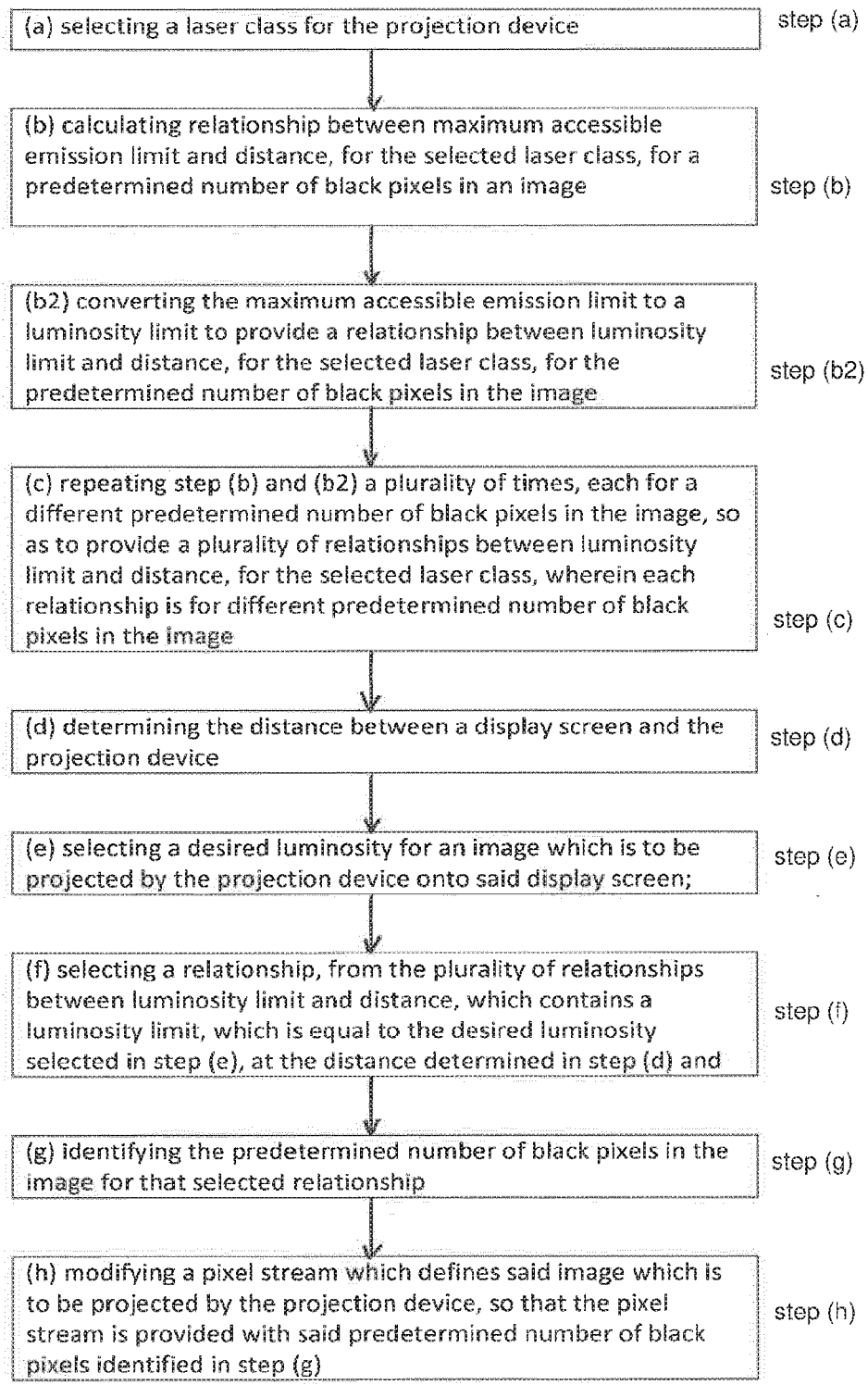
FIG. 3 shows a flow chart of the steps involved when performing the method according to the preferred embodiment of the present invention.

FIG. 3 is a flow chart illustrating the steps involves in a method according to the most preferred embodiment of the present invention. The method comprises the first step of selecting a laser class for the projection device (step (a)). In this example the laser class 1 is selected for the projection device.

Next the relationship between maximum accessible emission limit and distance, for the selected laser class, for a predetermined number of black pixels in an image, is calculated (step (b)). This is done using known tables and equations which are set out in the international laser classification system. The maximum accessible emission limit is the maximum accessible emission level permitted within a particular laser class. In this case the maximum accessible emission limit is the photo-thermal maximum accessible emission limit which is to protect persons against adverse thermal effects.

The international standard to calculate photo-thermal maximum accessible emission limit, as function of number of "black" portions of the image, and as function of distance is known from the technical report from the technical report IEC/TR 60825-13. The international standard to calculate photo-chemical maximum accessible emission limit as function of distance is known from the technical report from the technical report IEC/TR 60825-13.

Then the maximum accessible emission limit is converted to a luminosity limit to provide a relationship between luminosity limit and distance, for the selected laser class, for the predetermined number of black pixels in the image (step (b2)). The conversion between maximum accessible emission limit and luminosity limit is done as follows: The maximum accessible emission limit (MAEL) is expressed in Watts, it corresponds to the maximum optical power of the lasers. It is known that for a D65 white point, we need 21.5% blue, 31% green and 47.5% red. So the power limit for each laser will be:

$P\text{maxblue} = \text{MAEL} * 21.5\%$ $P\text{maxgreen} = \text{MAEL} * 31\%$ $P\text{maxred} = \text{MAEL} * 47.5\%$ It is known that the photopic eye sensitivity is:
115 lm/W for the red laser
453 lm/W for the green laser
19 lm/W for the blue laser
So the luminosity limit can be calculated as:

Luminosity limit=$P\text{maxblue}*19 + P\text{maxgreen}*453 + P\text{maxred}*115$ Steps (b) and (b2) are repeated a plurality of times, each for a different predetermined number of black pixels in the image, so as to provide a plurality of relationships between luminosity limit and distance, for the selected laser class, wherein each relationship is for different predetermined number of black pixels in the image (step (c)).

Figure 4:
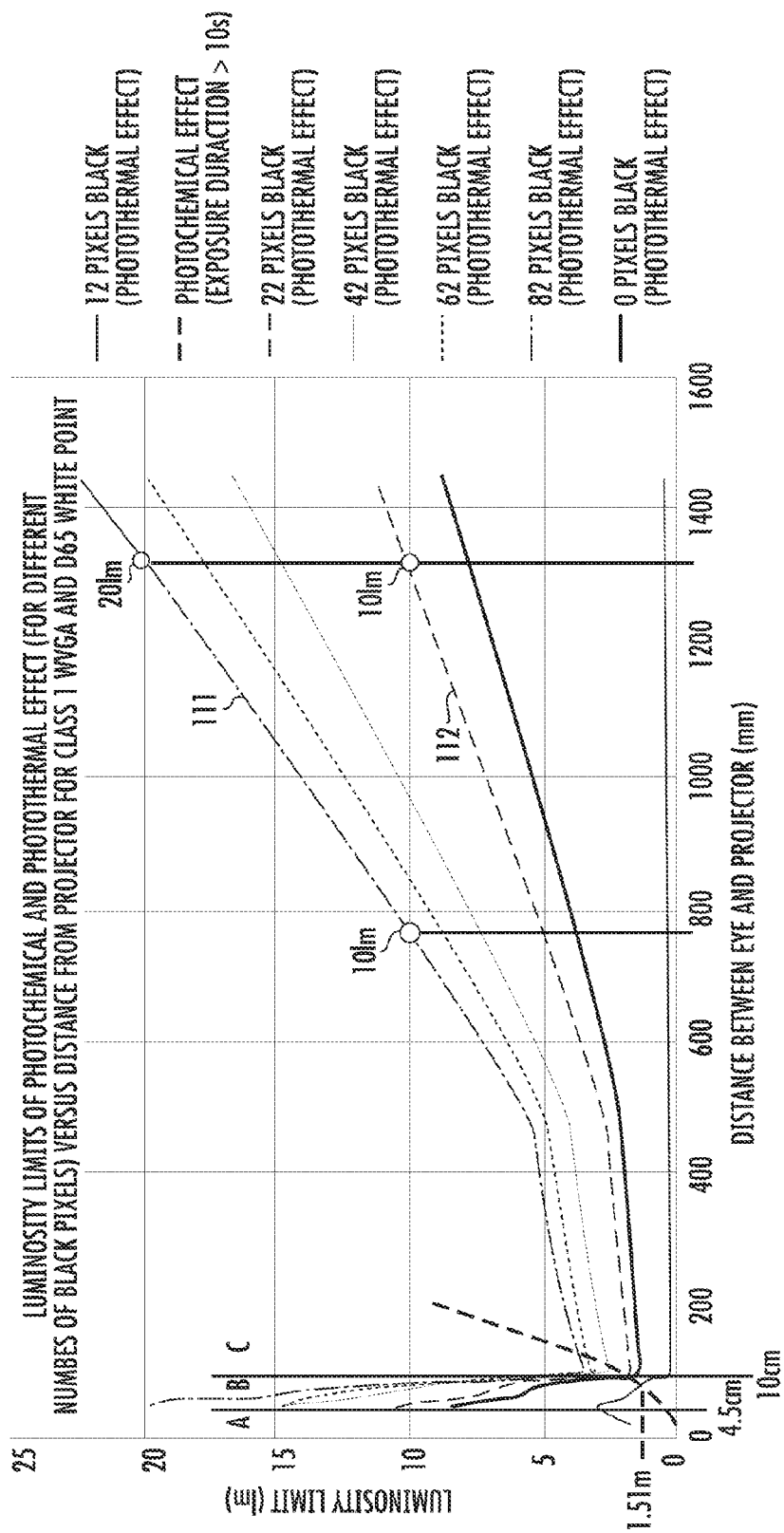
FIG. 4, shows a graph for a given laser class, with curves illustrating the relationship between the luminosity limit from a projection device versus distance from the projection device, each curve corresponding to when the projection device is projecting an image which is defined by a pixel stream which has been provided with a different predetermined number of black pixels.
Figure 7:
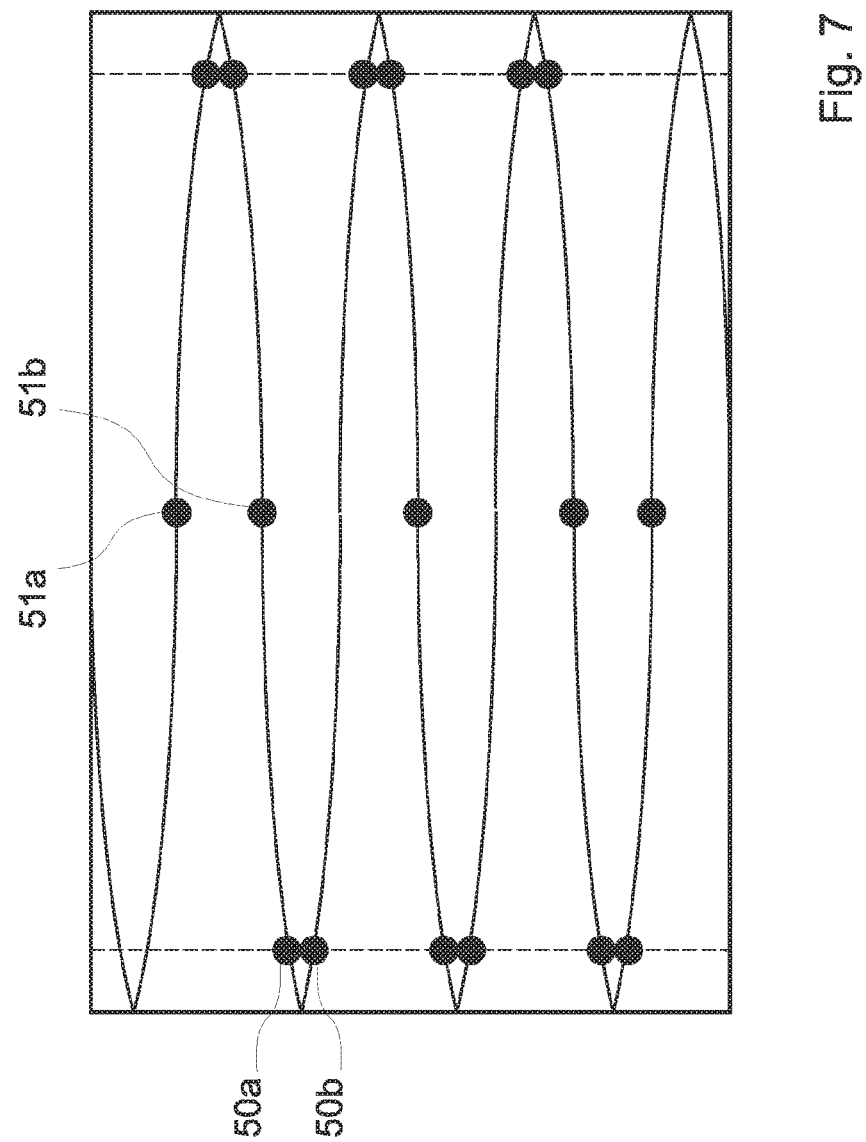
FIG. 7 illustrates pixels projected by a known projection device at different stages of the oscillation of a MEMS mirror.

The plurality of relationships between luminosity limit and distance, for the selected laser class, wherein each relationship is for different predetermined number of black pixels in the image, could be represented as curves on a graph, as a table, as one or more mathematical functions, or in any other suitable form. For example, FIG. 4 shows the relationships represented as curves on a graph. The distance from the projection device is shown along the x-axis and the luminosity limit for the projection device is shown along the y-axis. More specifically luminosity limit from the photo-thermal effect within the projection device is shown along the y-axis. The luminosity limit is the maximum luminosity level permitted, at a particular distance from the projection device, within a particular laser class.

Each of the curves shown in the graph of FIG. 4 illustrates the relationship between the luminosity limit for the projection device versus distance from the projection device for a class 1 projection device. Each curve corresponds to when the projection device is projecting an image, with a certain resolution, which is defined by a pixel stream which has a different predetermined number of black pixels. For example curve 111 corresponds to when the projection device is projecting an image with a certain resolution (e.g. WVGA resolution) which is defined by a pixel stream which has 85 black pixels and curve 112 corresponds to when the projection device is projecting an image which is defined by a pixel stream which has 22 black pixels. If the projection device follows the behaviour illustrated in one curves shown in the graph of FIG. 4, the projection device will be within the standards set for class 1 of the international laser class safety regulation, thus the projection device will be classified as a class 1 projection device. For example, in order for projection device to be class 1 under the international laser class safety regulation, then the light intensity of the light which is projected by the projection device, measured at 750 mm from the projection device, when projection device is projecting an image which contains 85 black pixels, must not exceed 10 lm.

Referring again to FIG. 3, after the relationships between the level of luminosity from the projection device versus distance from the projection device, for a given laser class, for when the pixel stream is provided with a different predetermined number of black pixels, has been determined, the distance between a display screen on which the image is to be projected and the projection device is determined (step (d)).

Next the user selects a desired luminosity for an image which is to be projected by the projection device onto said display screen (step (e)). In the next step (step (f), the user then selects a relationship, from the plurality of relationships between luminosity limit and distance, which contains a luminosity limit, which is equal to the desired luminosity selected in step (e), at the distance determined in step (d). Then in the next step (step (g)) the user identifies the predetermined number of black pixels in the image for that selected relationship. For example, referring to the graph in FIG. 4, if the projection device is located a distance 1350 mm from the display screen on which the image is to be projected, and if the user selects a desired luminosity of 20 Lm for the projected image, then the user can determine from the graph which curve contains a luminosity limit which is equal to the desired luminosity 20 Lm at a distance 1350 mm. It is identified from the graph that the curve 111 contains a luminosity limit of 20 Lm at a distance 1350 mm, and that the curve 111 corresponds to when the predetermined number of black pixels in the image is 85 (as illustrated in FIG. 4). Thus, in order for the projection device to remain class 1, 85 black pixels should be provided in the pixel stream which defines the pixels of the image which is to be projected by the projection device. If the user were to provide less than 85 black pixels in the pixel stream then the luminosity limit of the projection device would exceed that allowed for a class 1 and the projection device would therefore be considered more dangerous and would be classified as a class 2, 3, or 4 projection device according to the international laser class safety regulation.

Likewise if the projection device is located a distance 750 mm from the display screen on which the image is to be projected, and if the user selects a desired luminosity of 10 Lm for the projected image, (as illustrated in FIG. 4), then the user can determine that 85 black pixels should be provided in the pixel stream which defines the pixels of the image, in order for the projection device to remain a class 1 projection device i.e. so that the luminosity limit of the projection device does not exceed the luminosity limit for the class 1 of the international laser class safety regulation, at 750 mm from the projection device. Or, as per another example illustrated in FIG. 4, if the projection device is located a distance 1350 mm from the display screen on which the image is to be projected, and if the user selects a desired luminosity of 10 Lm for the projected image, (as illustrated in FIG. 4), then the user can determine that 22 black pixels should be provided in the pixel stream which defines the pixels of the image, in order for the projection device to remain a class 1 projection device i.e. so that the luminosity limit of the projection device does not exceed the luminosity limit for the class 1 of the international laser class safety regulation, at 750 mm from the projection device.

It will be understood that the although the graph in FIG. 4 shows curves which represent the required relationship between the luminosity limit for the projection device versus distance from the projection device, for class 1 of the international laser class safety regulation, is will be understood that a graph with curves which represent the required relationship for any of the other classes in the international laser class safety regulation could alternatively be used. For example, if the user wishes instead for their projection device to be a class 2 under the international laser class safety regulation, then they would use a graph similar to FIG. 4 but which has curves which represent the required relationship between the luminosity limit versus distance from the projection device, for different number of black pixels provided in the pixel stream which defines the image to be projected, corresponding to the standards for class 2 of the international laser class safety regulation.

Once the number of black pixels to be provided in the pixel stream has been determined the next step (step (h)) in the method is to modify a pixel stream which defines said image which is to be projected by the projection device, so that the pixel stream is provided with said predetermined number of black pixels identified in step (g). It should be noted that preferably a black pixel is defined when the laser source within the projection device emits no laser light. Accordingly to in order to provide one or more black pixels in the pixel stream the pixel stream should be provided with sections in which no light is emitted from the laser source within the projection device.

Most preferably the step of modifying the pixel stream comprises the step of modifying the pixel stream so that when the pixel stream is projected, said black pixels which are provided in the pixel stream, are projected to opposite sides of, or around the perimeter of, the projected image, as is shown in FIGS. 5a and 5b respectively. To ensure that the black pixels appear at opposite sides of, or around the perimeter of, the projected image when the pixel stream is projected, the black pixels which have been provided in the pixel stream should be received at the MEMS mirror as the MEMS mirror is changing its direction of oscillation about an oscillation axis (in other words each time the MEMS mirror reaches its maximum amplitude of oscillation).

FIG. 5a illustrates how the pixel stream appears on the display screen when projected using a projection device which has a MEMS mirror which oscillates about a single oscillation axis, and when the black pixels are provided in the pixel stream at positions so that they are received by a MEMS mirror in the projection device as the MEMS mirror is changing its direction of oscillation about that single oscillation axis. As seen in FIG. 5a the black pixels 30 will appear as vertical bands 31 on opposite sides 32a,b of the projected image 35, as shown in FIG. 5a. Because of the black pixels 30 which have been provided in the pixel stream the projection device does not project a high concentration of photons projected to any region on the display screen.

To increase the thickness of the bands 31 of black pixels 30 on opposite sides 32a,b of the projected image 35, the black pixels 30 are preferably provided in the pixel stream at positions so that they are received by a MEMS mirror in the projection device before, during and after the MEMS mirror is changing its direction of oscillation about the single oscillation axis. Preferably the black pixels are provided in the pixel stream at positions so that they are received by a MEMS mirror in the projection device when the MEMS mirror is between −40°-−50° from its starting position (0°) or rest position (0°) and are received by a MEMS mirror in the projection device when the MEMS mirror is between +40°-+50° from its starting position or rest position (0°), wherein +50° and −50° are the positions of the MEMS mirror when the MEMS mirror is at its maximum amplitude of oscillation. Thus as the MEMS mirror is between −40°-−50° and between +40°-+50° from its starting position (0°), the MEMS mirror will reflect the black pixels only to the display screen. Preferably, the starting position (0°) or rest position (0°) will be the position the MEMS mirror is in when the MEMS mirror is inoperative.

In an alternative embodiment the MEMS mirror of the projection device is configured to oscillate about two orthogonal oscillation axis. In this case the method preferably comprises the step of receiving the black pixels, which have been provided in the pixel stream, as the MEMS mirror is changing its direction of oscillation about each of the two oscillation axes (in other words each time the MEMS mirror reaches its maximum amplitude of oscillation about each oscillation axes) so that the black pixels appear around the perimeter of the projected image when the pixel stream is projected; as shown in FIG. 5b. The black pixels 30 will appear as vertical and horizontal bands 37a,b on opposite sides 32a,b and top and bottom 33a,b of the projected image 38.

To increase the thickness of the vertical and horizontal bands 37a,b of black pixels 30 the black pixels 30 are preferably provided in the pixel stream at positions so that they are received by a MEMS mirror in the projection device before, during and after, the MEMS mirror is changing its direction of oscillation about each of the two oscillation axes.

The step of modifying the pixel stream so that the pixel stream which defines the image to be projected is provided with said predetermined number of black pixels, can be executed a number of different ways:

In one embodiment of the method the step of modifying the pixel stream so that the pixel stream which defines the image to be projected is provided with said predetermined number of black pixels, comprises the step of converting pixels in the pixel stream into black pixels. The number of pixels in the pixel stream which are converted to black pixels is equal to said predetermined number of black pixels identified in step (h) and the pixels which are converted to black pixels are those pixels which are destined to be located at opposite sides of, or at the perimeter of, the image when projected. Essentially to perform this conversion, pixels which define part of the image to be projected are removed from the pixel stream and are replaced with black pixels. The pixels which define portions of the image which are at opposite sides of the image or which define portions of the image which are around the perimeter of the image, are removed from the pixel stream. The black pixels are provided in the pixel stream in the same position as where the pixels were removed so that when the pixel stream is projected the black pixels will appear at opposite sides of the projected image or around the perimeter of the projected image, as is shown in FIGS. 5a and b respectively.

In another embodiment the step of modifying the pixel stream so that the pixel stream which defines the image to be projected is provided with said predetermined number of black pixels, comprises the steps of, compressing pixels in the pixel stream, and then, adding black pixels to the compressed pixel stream. Preferably, the pixel stream is compressed by a number of pixels equal to the predetermined number of black pixels and the number of black pixels which are then added to the compressed pixel stream is equal to the predetermined number of black pixels. Accordingly the number of pixels in the pixel stream after it has been modified will be the same as the number of pixels which were in the original pixel stream.

In a further embodiment the step of modify the pixel stream so that the pixel stream which defines the image to be projected is provided with said predetermined number of black pixels, comprises the steps of, adding said predetermined number of black pixels to the pixel stream to form a modified pixel stream which comprises image-defining-pixels and added-black-pixels, and then, increasing the scanning angle of the MEMS mirror. The scanning angle is preferably increased by increasing the amplitude of oscillation of the MEMS mirror about its one or more oscillation axes. The scanning angle of the MEMS mirror is increased by the ratio (the number of black pixels which have been provided in the pixel stream+the number of image-defining-pixels)/(the total number of pixels in the pixel stream which are to be projected), in other words, the scanning angle is increased proportional to the number of black pixels which have been added to the pixel stream. Because black pixels are added to the pixel stream, the number of pixels in the modified pixel stream are greater than the number of pixels which were in the original pixel stream; the scanning angle of the MEMS mirror increased so as to accommodate the additional pixels thereby preventing the projected image from appearing distorted.

The duration of each of the image-defining-pixels in the modified pixel stream is also modified to compensate for the speed of oscillation of the MEMS mirror. Due to the black-pixels which have been added to the pixel stream, the image-defining-pixels will now each reach the MEMS mirror at a different stage in the MEMS mirror's oscillation; the speed of oscillation of the MEMS mirror will be faster when each of the image-defining-pixels reach the MEMS mirror compared to if no black pixels had been added to the pixel stream. To compensate for the difference in the speed of oscillation of the MEMS mirror when the image-defining-pixels reach the MEMS mirror, the duration of each of the image-defining-pixels is the modified.

The MEMS mirror oscillation is a sine wave, therefore one can calculate the position of the MEMS mirror as a function of time; from that, to ensure that the size of each pixel is a constant over the whole of the projected image the duration of each image-defining-pixel is modified so that each image-defining-pixel has the appropriate duration which ensures that the size of all the image-defining-pixels will be equal to the constant across the whole of the projected image. The pixel duration corresponds to the time taken by the MEMS mirror to move from the start position to the end position of the pixel. The duration of the image-defining-pixel which define the centre part of the projected image are modified so that their duration is shorter, and the duration of the image-defining-pixel which define the boarder of the projected image are modified so that their duration is longer; this will ensure that the size of the pixels across the projected image is a constant. The appropriate duration of each of the image-defining-pixels in the pixel stream is calculated as follows:

$$\text{Pixel\_duration}(t) = (Res/2) * \sin(2pi*t*Fr - pi/2)$$

Wherein "Res" is the image horizontal resolution (which is a predefined value depending on desired image quality), Fr is the resonant frequency of the MEMS mirror and "t" is the time.

The duration of each of the pixels is modified by software. The software, for example embedded in an programmable microcontroller or FPGA, provides signals the is in cooperation with the defined predefined pixel duration, the cooperation may be by means of signal duty cycle, and/or signal duration, and/or signal amplitude. This signal is then used to control a laser driver that provides current to the laser in relation of the input signal parameter. For example it can be that if the input signal has a certain duration, the laser driver will provide current to the laser with an equivalent duration. Data such as mirror Frequency and image resolution can be embedded in the programmable microcontroller of FPGA.

As discussed FIG. 4 shows a graph which contains curves, each curve represents the relationship between luminosity limit for the projection device versus distance from the projection device, for the laser class 1, wherein each curve in the is for different predetermined number of black pixels in the image to be projected. It will be understood that, in a further embodiment of the present invention, graphs each similar to that shown in FIG. 4 but which contain curves which illustrate the relationships between the level of luminosity from the projection device versus distance from the projection device, for other laser classes (e.g. classes 2, 3 and/or 4) of the international laser class safety regulation, could also be determined. These graphs could be determined as for the graph in FIG. 4, using methods known in the art. In this case the method would preferably further comprise the step of the user selecting a laser class for the projection device; in other words selecting which class they desire the projection device to be. Then selecting the graph which corresponds to that selected laser class. The selected graph would then be used curves displayed on the selected graph would then be used when performing steps (g) and (h) above to determine the number of black pixels which are to be provided in the pixel stream so that the projection meets the requirements for the selected laser class.

In a further embodiment the method may further comprise the steps of, determining the relationship between the luminosity limit from a photo-chemical effect within the laser of the projection device and the distance from the projection device, for a given laser class. This is preferably done by calculating relationship between photo-chemical maximum accessible emission limit and distance, for the selected laser class. The photo-chemical maximum accessible emission limit is to protect persons against adverse photochemical effect (for example, photoretinitis—a photochemical retinal injury from exposure to radiation in the wavelength range from 400 nm to 600 nm). The international standard to calculate photo-chemical maximum accessible emission limit and photo-thermal maximum accessible emission limit, as function of distance is known from the standard IEC 60825-1 and the technical report IEC/TR 60825-13.

Then the photo-chemical maximum accessible emission limit is converted to a luminosity limit, in the same manner as shown above (i.e. as was done above for the photo-thermal maximum accessible emission limit), to provide a relationship between luminosity limit and distance, for the selected laser class, for the predetermined number of black pixels in the image.

The embodiment further comprises the step of, when the distance between the projection device and display screen is 10 cm or less, and, if luminosity limit from the photo-chemical effect within the projection device is greater than luminosity limit from the photo-thermal effect within the projection device, modifying the pixel stream which defines the image to be projected so that the pixel stream is provided with a predetermined number of black pixels so that the luminosity limit from the photo-chemical effect within the projection device is less than luminosity limit from a photo-thermal effect within the projection device.

In a further embodiment of the present invention the acceleration of the projection device is measured. This can be done using an accelerometer which provided on the projection device. When the measured acceleration is above a threshold acceleration, a step of modifying the pixel stream so that the pixel stream which defines the image to be projected is provided with a predetermined number of black pixels which ensures that the projection device has a luminosity limit which is less than a defined threshold safety luminosity. Preferably the defined threshold safety luminosity is 1.5 lumens for class 1 standard under the international laser class safety regulation.

FIG. 6 shows a projection device 40 according to another aspect of the present invention, which can project an image 35 with improved safety onto a display screen 41. The projection device 40 comprises a software module and the software module 42 comprises software which is configured to carry out any of the methods described above. The projection device 40 further comprises a distance measuring 43 means, in the form of a laser range finder 43, for determining the distance between the 41 display screen and the projection device 40. In an alternative embodiment the projection device is further provided, or is alternatively provided, with a proximity sensor.

In this particular example the projection device further comprises an accelerometer 44 which can measure the acceleration of the projection device 40. The software in the software module 42 is further configured to receive accelerations measured by the accelerometer 44 and to detect if the acceleration measured by the accelerometer is greater than a threshold acceleration. If the software in the software module 42 is further configured to modify the pixel stream which defines the projected image 35 so that the pixel stream is provided with a predefined number of black pixels which ensure that the luminosity limit of projection device 40 is less than or equal to the luminosity limit for class 1 standard, if the software detects that the acceleration measured by the accelerometer is greater than a threshold acceleration. Preferably the predefined luminosity limit is less than the luminosity limit, at distance 10 cm, for 22 number of black pixels, for class 1 standard under the international laser class safety regulation.

Note that preferably the black pixels which are defined by a laser light intensity of zero. In an alternative embodiment the black pixels may be defined by a non-zero light intensity; for example, the black pixel may be defined by a non-zero light intensity between zero to 1.8 mW, while the system remaining under the class it was designed for, for example class 1.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. At least one non-transitory machine-readable storage medium comprising instructions that when executed by a processing unit coupled to a projection device comprising a laser to emit a pixel stream to define an image, cause the processing unit to:
    identify a first distance between a display screen and the projection device; and
    adjust, based on the first distance, a number of black pixels in the pixel stream to limit a luminosity of the laser at the first distance to below a luminosity limit for a laser safety class.

2. The at least one non-transitory machine-readable storage medium of claim 1, comprising instructions that when executed by the controller cause the projection device to:
    identify a second distance between the display screen and a viewer; and
    adjust the number of the black pixels in the pixel stream based in part on the second distance to limit the luminosity of the laser at the second distance below the luminosity limit for the laser safety class.

3. The at least one non-transitory machine-readable storage medium of claim 1, comprising instructions that when executed by the controller cause the projection device to adjust a location of the black pixels in the pixel stream to limit the luminosity of the laser at the first distance below the luminosity limit for the laser safety class.

4. The at least one non-transitory machine-readable storage medium of claim 3, comprising instructions that when executed by the controller cause the projection device to modify the pixel stream to provide that the black pixels are located at opposite sides of the defined image or around a perimeter of the defined image.

5. The at least one non-transitory machine-readable storage medium of claim 4, the projection device comprising a microelectromechanical system (MEMS) mirror to receive the pixel stream from the laser and reflect the pixel stream onto the projection surface, comprising instructions that when executed by the controller cause the projection device to:
    send a control signal to at least one of the MEMS mirror or the laser to provide that the MEMS mirror reflects the black pixels in the pixel stream as the MEMS mirror is changing direction of oscillation about an oscillation axis; or
    send a control signal to at least one of the MEMS mirror or the laser to provide that the MEMS mirror reflects the black pixels in the pixel stream as the MEMS mirror is changing direction of oscillation about a first oscillation axis and a second oscillation axis to project the black pixels around the perimeter of the image.

6. The at least one non-transitory machine-readable storage medium of claim 1, comprising instructions that when executed by the controller cause the projection device to:
    convert pixels in the pixel stream into black pixels to adjust the number of black pixels in the pixel stream to adjust the number of black pixels in the pixel stream; or
    compress the pixel stream and add black pixels to the compressed pixel stream to adjust the number of black pixels in the pixel stream.

7. The at least one non-transitory machine-readable storage medium of claim 1, the projection device comprising a microelectromechanical system (MEMS) mirror to receive the pixel stream from the laser and reflect the pixel stream onto the projection surface, comprising instructions that when executed by the controller cause the projection device to:
    add black pixels to the pixel stream to generate a modified pixel stream comprising image-defining-pixels and added-black-pixels; and
    increase a scanning angle of the MEMS mirror.

8. A method, comprising:
    identifying a first distance between a display screen and the projection device, the projection device comprising a laser to emit a pixel stream to define an image on the display screen; and
    adjusting a number of black pixels in the pixel stream which based in part on the first distance to limit a luminosity of the laser at the first distance below a luminosity limit for a laser safety class.

9. The method of claim 8, comprising:
    identifying a second distance between the display screen and a viewer; and
    adjusting the number of the black pixels in the pixel stream which based in part on the second distance to limit the luminosity of the laser at the second distance below the luminosity limit for the laser safety class.

10. The method of claim 8, comprising adjusting a location of the black pixels in the pixel stream to limit the luminosity of the laser at the first distance below the luminosity limit for the laser safety class.

11. The method of claim 10, comprising modifying the pixel stream to provide that the black pixels are located at opposite sides of the defined image or around a perimeter of the defined image.

12. The method of claim 11, the projection device comprising a microelectromechanical system (MEMS) mirror to receive the pixel stream from the laser and reflect the pixel stream onto the projection surface, the method comprising sending a control signal to at least one of the MEMS mirror or the laser to provide that the MEMS mirror reflects the black pixels in the pixel stream as the MEMS mirror is changing direction of oscillation about an oscillation axis.

13. The method of claim 11, the projection device comprising a microelectromechanical system (MEMS) mirror to receive the pixel stream from the laser and reflect the pixel stream onto the projection surface, the method comprising sending a control signal to at least one of the MEMS mirror or the laser to provide that the MEMS mirror reflects the black pixels in the pixel stream as the MEMS mirror is changing direction of oscillation about a first oscillation axis and a second oscillation axis to project the black pixels around the perimeter of the image.

14. The method of claim 8, adjusting the number of black pixels in the pixel stream comprising converting pixels in the pixel stream into black pixels.

15. The method of claim 8, adjusting the number of black pixels in the pixel stream comprising:
    compressing the pixel stream; and
    adding black pixels to the compressed pixel stream.

16. The method of claim 8, the projection device comprising a microelectromechanical system (MEMS) mirror to receive the pixel stream from the laser and reflect the pixel stream onto the projection surface, adjusting the number of black pixels in the pixel stream comprising:
    adding black pixels to the pixel stream to generate a modified pixel stream comprising image-defining-pixels and added-black-pixels; and
    increasing a scanning angle of the MEMS mirror.

17. An apparatus comprising:
    a processor for a projection device; and
    a memory coupled to the processor, the memory comprising instructions, which when executed by the processor cause the processor to:

identify a first distance between a display screen and the projection device, the projection device comprising a laser to emit a pixel stream to define an image on the display screen; and adjust a number of black pixels in the pixel stream which based in part on the first distance to limit a luminosity of the laser at the first distance below a luminosity limit for a laser safety class.

18. The apparatus of claim 17, the memory comprising instructions that when executed by the processor cause the processor to:

identify a second distance between the display screen and a viewer; and adjust the number of the black pixels in the pixel stream which based in part on the second distance to limit the luminosity of the laser at the second distance below the luminosity limit for the laser safety class.

19. The apparatus of claim 17, the memory comprising instructions that when executed by the processor cause the processor to adjust a location of the black pixels in the pixel stream to limit the luminosity of the laser at the first distance below the luminosity limit for the laser safety class.

20. The apparatus of claim 18, the memory comprising instructions that when executed by the processor cause the processor to modify the pixel stream to provide that the black pixels are located at opposite sides of the defined image or around a perimeter of the defined image.

21. The apparatus of claim 20, comprising a microelectromechanical system (MEMS) mirror to receive the pixel stream from the laser and reflect the pixel stream onto the projection surface, the memory comprising instructions that when executed by the processor cause the processor to send a control signal to at least one of the MEMS mirror or the laser to provide that the MEMS mirror reflects the black pixels in the pixel stream as the MEMS mirror is changing direction of oscillation about an oscillation axis.

22. The apparatus of claim 20, comprising a microelectromechanical system (MEMS) mirror to receive the pixel stream from the laser and reflect the pixel stream onto the projection surface, the memory comprising instructions that when executed by the processor cause the processor to send a control signal to at least one of the MEMS mirror or the laser to provide that the MEMS mirror reflects the black pixels in the pixel stream as the MEMS mirror is changing direction of oscillation about a first oscillation axis and a second oscillation axis to project the black pixels around the perimeter of the image.

23. The apparatus of claim 17, the controller to convert pixels in the pixel stream into black pixels to adjust the number of black pixels in the pixel stream.

24. The apparatus of claim 17, the controller to compress the pixel stream and add black pixels to the compressed pixel stream to adjust the number of black pixels in the pixel stream.

25. The apparatus of claim 17, comprising the projection device, the projection device comprising a microelectromechanical system (MEMS) mirror to receive the pixel stream from the laser and reflect the pixel stream onto the projection surface, controller to:

add black pixels to the pixel stream to generate a modified pixel stream comprising image-defining-pixels and added-black-pixels; and increase a scanning angle of the MEMS mirror to adjust the number of black pixels in the pixel stream.

* * * * *